(12) United States Patent
Liu et al.

(10) Patent No.: US 12,437,778 B2
(45) Date of Patent: *Oct. 7, 2025

(54) ELECTROPLATING OF HIGH DAMPING MATERIAL FOR TRAILING SHIELD IN A PERPENDICULAR MAGNETIC RECORDING WRITER

(71) Applicant: Headway Technologies, Inc., Milpitas, CA (US)

(72) Inventors: Xiaomin Liu, Fremont, CA (US); Wenjie Chen, Cupertino, CA (US); Yue Liu, Fremont, CA (US); Weihao Xu, San Jose, CA (US); Yuhui Tang, Milpitas, CA (US); Feiyue Li, Newark, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,025

(22) Filed: Apr. 2, 2024

(65) Prior Publication Data

US 2024/0347072 A1  Oct. 17, 2024

Related U.S. Application Data

(63) Continuation of application No. 18/133,374, filed on Apr. 11, 2023, now Pat. No. 11,978,488.

(51) Int. Cl.
*G11B 5/11* (2006.01)
*G11B 5/127* (2006.01)
*G11B 5/31* (2006.01)

(52) U.S. Cl.
CPC .............. *G11B 5/112* (2013.01); *G11B 5/11* (2013.01); *G11B 5/1278* (2013.01); *G11B 5/315* (2013.01); *G11B 5/3163* (2013.01); *Y10T 29/49043* (2015.01)

(58) Field of Classification Search
None
See application file for complete search history.

(56) References Cited

U.S. PATENT DOCUMENTS

| 4,279,707 A | 7/1981 | Anderson et al. |
| 5,883,762 A | 3/1999 | Calhoun et al. |
| 6,025,978 A | 2/2000 | Hoshi et al. |
| 7,144,489 B1 | 12/2006 | Filas |
| 9,082,432 B1 | 7/2015 | Matsuura et al. |

(Continued)

OTHER PUBLICATIONS

Office Action in U.S. Appl. No. 18/133,374, dated Sep. 11, 2023.
Notice of Allowance in U.S. Appl. No. 18/133,374, dated Jan. 10, 2024.

*Primary Examiner* — Craig A. Renner
(74) *Attorney, Agent, or Firm* — DLA Piper LLP (US)

(57) ABSTRACT

The present embodiments relate to a PMR write head with a trailing shield that comprises a FeCoNiM composition. The FeCoNiM composition can be formed via an electroplating process by adding $Fe^{2+}$, $Co^{2+}$, $Ni^{2+}$ and a transition metal salt to an aqueous solution comprised of other additives in an electroplating cell that has an Ni or Co as the anode. The plated HD magnetic material as the trailing shield in a PMR writer can minimize a wide area track erasure (WATE). Further, a high moment high damping shield can lower bit error rate (BER) and increase aerial density capability (ADC) of the write head.

18 Claims, 5 Drawing Sheets

(56) References Cited

U.S. PATENT DOCUMENTS

| | | |
|---|---|---|
| 9,466,319 B1 | 10/2016 | Tang et al. |
| 10,014,021 B1 | 7/2018 | Liu et al. |
| 10,490,210 B1 | 11/2019 | Liu et al. |
| 10,522,178 B1 | 12/2019 | Liu et al. |
| 10,770,103 B1 | 9/2020 | Liu et al. |
| 11,978,488 B1 | 5/2024 | Liu et al. |
| 2004/0217007 A1 | 11/2004 | Diel et al. |
| 2006/0098334 A1 | 5/2006 | Jayasekara et al. |
| 2017/0076742 A1 | 3/2017 | Tang et al. |
| 2018/0144768 A1 | 5/2018 | Liu et al. |
| 2018/0330748 A1 | 11/2018 | Liu et al. |
| 2022/0106688 A1 | 4/2022 | Nakata et al. |

ELECTROPLATING OF HIGH DAMPING MATERIAL FOR TRAILING SHIELD IN A PERPENDICULAR MAGNETIC RECORDING WRITER

CROSS REFERENCE TO RELATED APPLICATIONS

This application is a continuation of U.S. application Ser. No. 18/133,374, filed Apr. 11, 2023, the entire disclosure of which is hereby incorporated by reference.

TECHNICAL FIELD

Embodiments of the invention relate to the field of electro-mechanical data storage devices. More particularly, embodiments of the invention relate to a high density magnetic trailing shield composition as part of a perpendicular magnetic recording (PMR) write head.

BACKGROUND

A magnetic recording medium (e.g., a magnetic disk) can store magnetic bits representing digital data. A PMR writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR). HAMR techniques increase the density of HDDs by applying heat to a portion of the magnetic recording medium, which can enhance write performance of the write head to the magnetic recording medium.

SUMMARY

The present embodiments relate to a PMR write head with a trailing shield that comprises a FeCoNiM composition. The FeCoNiM composition can be formed via an electroplating process by adding $Fe^{2+}$, $Co^{2+}$, $Ni^{2+}$ and a transition metal salt to an aqueous solution comprised of other additives in an electroplating cell that has an Ni or Co as the anode. The plated high damping (HD) magnetic material as the trailing shield in a PMR writer can minimize a WATE. Further, a high moment high damping shield can lower BER and increase ADC of the write head.

In a first example embodiment, a perpendicular magnetic recording (PMR) write head is provided. The PMR write head can include a main pole, a side shield disposed around the main pole, and a leading shield disposed at a tip portion of the main pole. The PMR write head can also include a trailing shield disposed adjacent to the main pole. The trailing shield can comprise an iron (Fe)-cobalt (Co)-nickel (Ni)-metal (M) composition.

In some instances, the trailing shield is comprised of a composition having the following formula:

wherein: Fe is iron, Co is cobalt, Ni is nickel and M is metal;

w, x, y and z can be the concentrations of Fe, Co, Ni and M, respectively, in atomic percent (%);

M can include a 3d, 4d, and 5d transition metal;

w can be between 15 to 70, x can be between 0 to 10, y can be between 20 to 70 and z can be between 2 to 10, and w+x+y+z=100.

In some instances, the trailing shield is disposed on the main pole via electroplating the trailing shield using a mask. In some instances, electroplating the trailing shield using the mask includes adding a ferrous iron ($Fe^{2+}$), cobalt 2+ ($Co^{2+}$), nickel 2+ ($Ni^{2+}$) and a transition metal salt to an aqueous solution comprised of one or more additives in an electroplating cell that has an Ni or Co as an anode.

In another example embodiment, a method for disposing a trailing shield on a main pole of a perpendicular magnetic recording (PMR) write head is provided. The method can include adding a ferrous iron ($Fe^{2+}$), cobalt 2+ ($Co^{2+}$), nickel 2+ ($Ni^{2+}$) and a transition metal salt to an aqueous solution comprised of one or more additives in an electroplating cell that has an Ni or Co as an anode. A result of the addition can comprise an iron (Fe)-cobalt (Co)-nickel (Ni)-metal (M) composition. The method can also include disposing the trailing shield including the FeCoNiM composition over the main pole of the PMR write head.

In some instances, a plating bath is used to plate the desired materials on HD magnetic material according to methods described herein. In one exemplary embodiment, the plating bath is comprised of an aqueous solution that can include any of a set of chemicals in concentrations as described in Table 1. Other chemical constituents may be used with the spirit and teaching of the present disclosure.

In some instances, a temperature of the plating bath aqueous solution is between 10-30 degrees Celsius, and a pH level is between 2-4. In some instances, the plating current waveform includes a forward plating peak current density ($I_{fp}$) from 10 to 50 mA/cm², a forward plating peak time between 3 to 100 ms, a reverse plating peak current density ($I_{rp}$) from 0 to 15 mA/cm², and/or a reverse plating peak time between 0 to 100 ms.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of HDD writing, both the write head and digital data written to the magnetic recording medium can be made smaller.

Particularly, wide adjacent track erasure (WATE) is one of the most critical issues for perpendicular magnetic recording (PMR) write heads. In order to minimize the WATE, a high damping (HD) magnetic material with a damping constant>=0.04 can be used as the trailing shield.

The present embodiments can relate to a PMR write head with a trailing shield that comprises a FeCoNiM composition. The FeCoNiM composition can be formed via an electroplating process by adding $Fe^{2+}$, $Co^{2+}$, $Ni^{2+}$ and a transition metal salt to an aqueous solution comprised of other additives in an electroplating cell that has an Ni or Co as the anode. The plated HD magnetic material as the trailing shield in a PMR writer can minimize a WATE. Further, a high moment high damping shield can lower BER and increase ADC of the write head.

Figure 1:
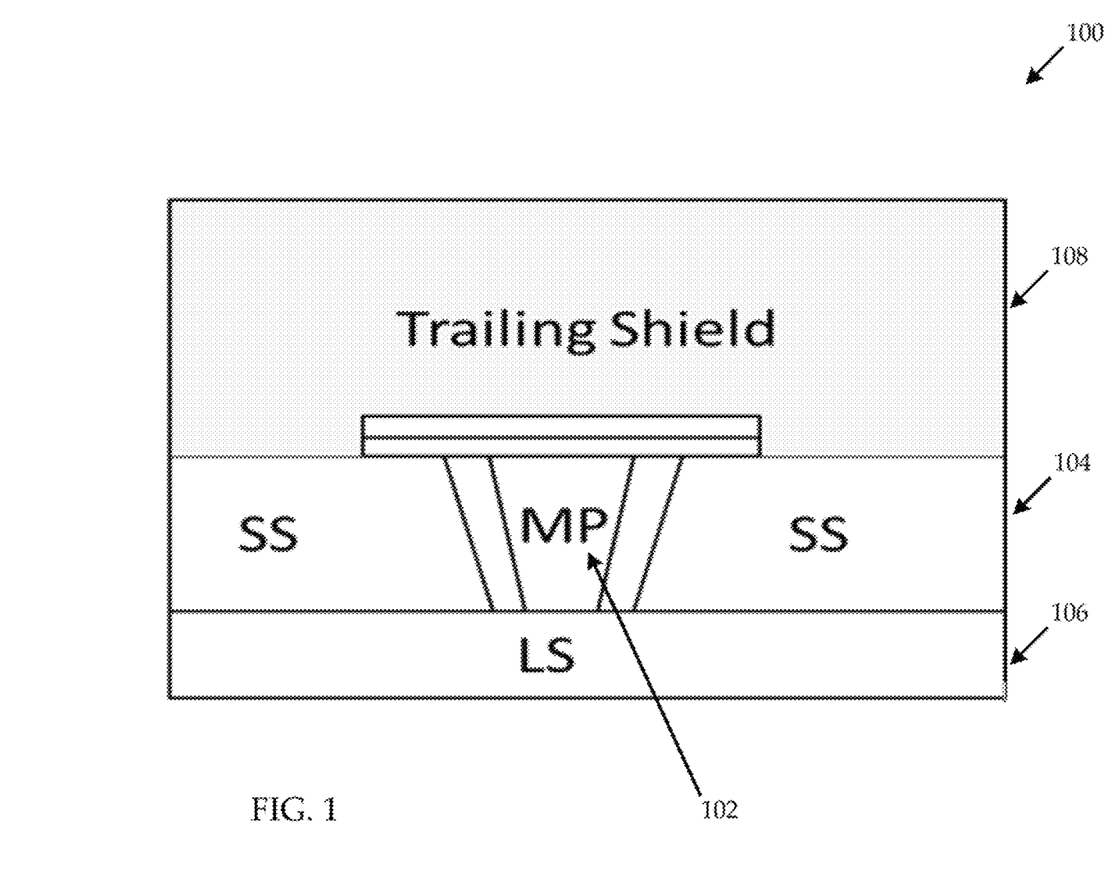
FIG. 1 is an ABS view of a PMR writer with an all wrap around shield structure including the trailing shield. according to an embodiment.

FIG. 1 is an ABS view of a PMR writer 100 with an all wrap around shield structure including the trailing shield. As shown in FIG. 1, the write head 100 can include a main pole (MP) 102, side shield (SS) 104 disposed around sides of the MP 102, a leading shield (LS) 106, and a trailing shield 108.

The HD magnetic trailing shield 108 can have a composition represented by $Fe_wCo_xNi_yM_z$ in which w,x,y and z are the atomic % of Fe, Co, Ni and M respectively. M can include a 3d, 4d or 5d transition metal. W can be between 15 to 70, X can be between 0 to 10, Y can be between 20 to 70, z is between 2 to 10. The combination of W, X, Y, and Z equal 100.

An electroplating through the mask process can be used to fabricate the trailing shield. $Fe_wCo_xNi_yM_z$ can be achieved by adding $Fe^{2+}$, $Co^{2+}$, $Ni^{2+}$ and a transition metal salt to an aqueous solution comprised of other additives in an electroplating cell that has an Ni or Co as the anode. One example of the plating bath formula is shown in Table 1.

TABLE 1

| Plating bath | g/L |
|---|---|
| $FeSO_4 \cdot 7H_2O$ | 5-30 |
| $NiSO_4 \cdot 6H_2O$ | 10-50 |
| $NiCl_2 \cdot 6H_2O$ | 10-50 |
| $CoSO_4 \cdot 7H_2O$ | 0-20 |
| $H_3BO_3$ | 20-30 |
| Saccharin Na | 0-2 |
| Sodium lauryl sulfate | 0.01-0.2 |
| Ammonium Perrhenate (g/L) | 0.04-1.5 |

Figure 2:
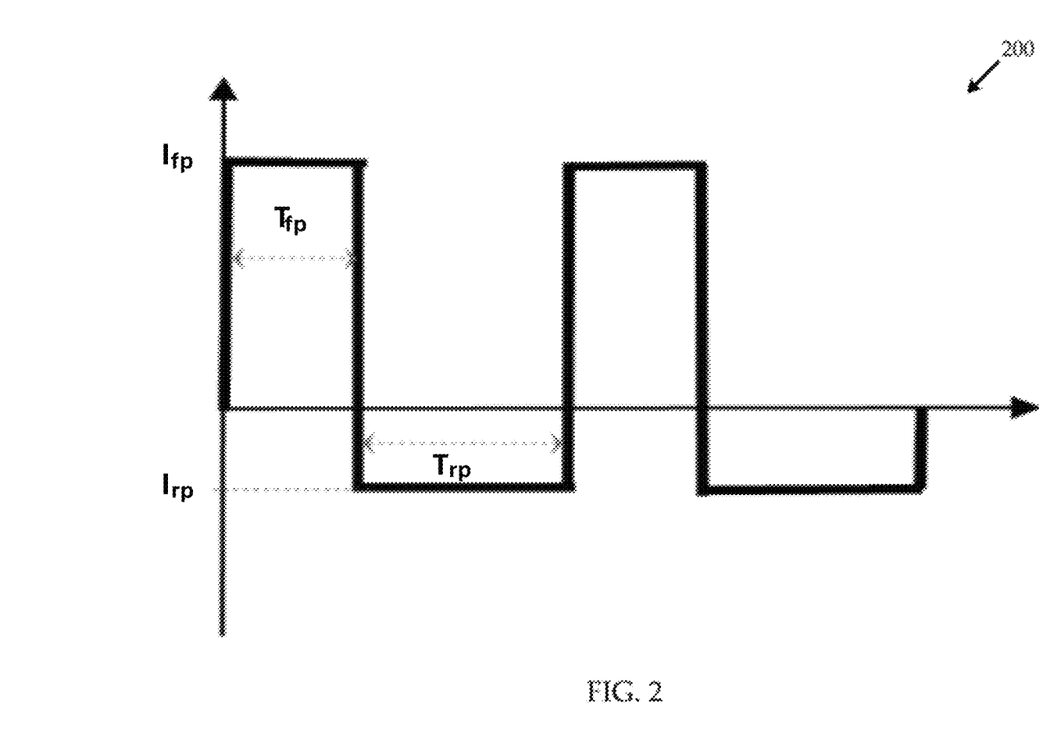
FIG. 2 illustrates an example pulse waveform for a plating condition, according to an embodiment.

The plating bath temperature can be maintained between 10° C. to 30° C., and its pH can be maintained between 2 to 4. A pulse waveform (as shown in FIG. 2) has been used to deposit the HD magnetic material. FIG. 2 illustrates an example pulse waveform 200 for the plating bath. The forward plating peak current density ($I_{fp}$) is from 10 to 50 mA/cm² and forward plating peak time ($T_{fp}$) is between 3 to 100 ms. The reverse plating peak current density ($I_{rp}$) can be from 0 to 15 mA/cm² and reverse plating peak time ($T_{rp}$) can be between 0 to 100 ms.

Figure 3:
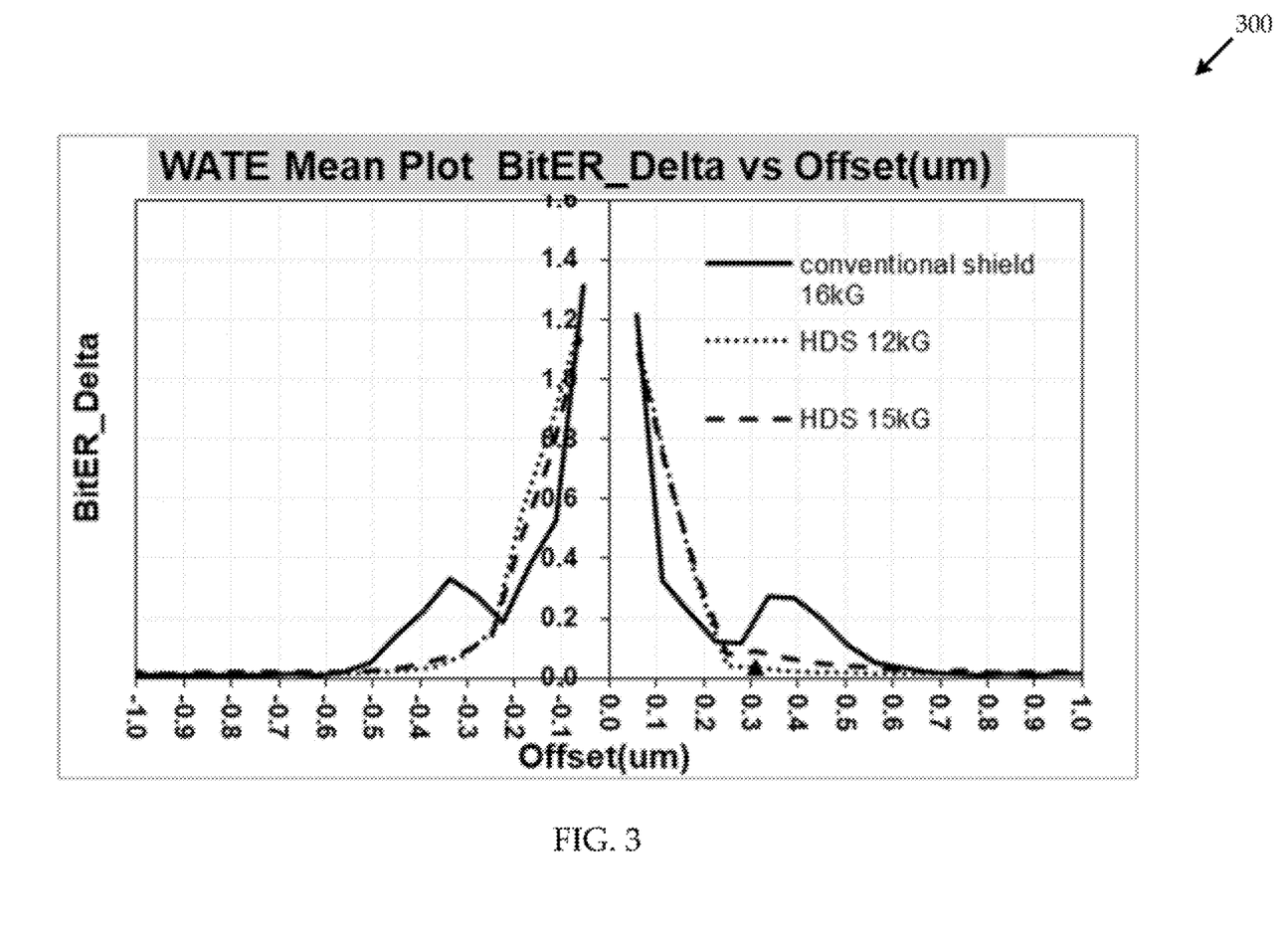
FIG. 3 is a graphical illustration of a WATE mean plot according to an embodiment.

The plated HD magnetic materials can have a Bs between 3-22 KG, and Hc between 0.1 to 8 Oe. The damping constant can be either greater than or equal to 0.04. The PMR writer with high damping shield (HDS) can have an improved WATE, as is shown in FIG. 3. FIG. 3 is a graphical illustration of a WATE mean plot 300. As shown in FIG. 3, the plot 300 can compare a Bit ER_Delta and an offset (in um).

Figure 4:
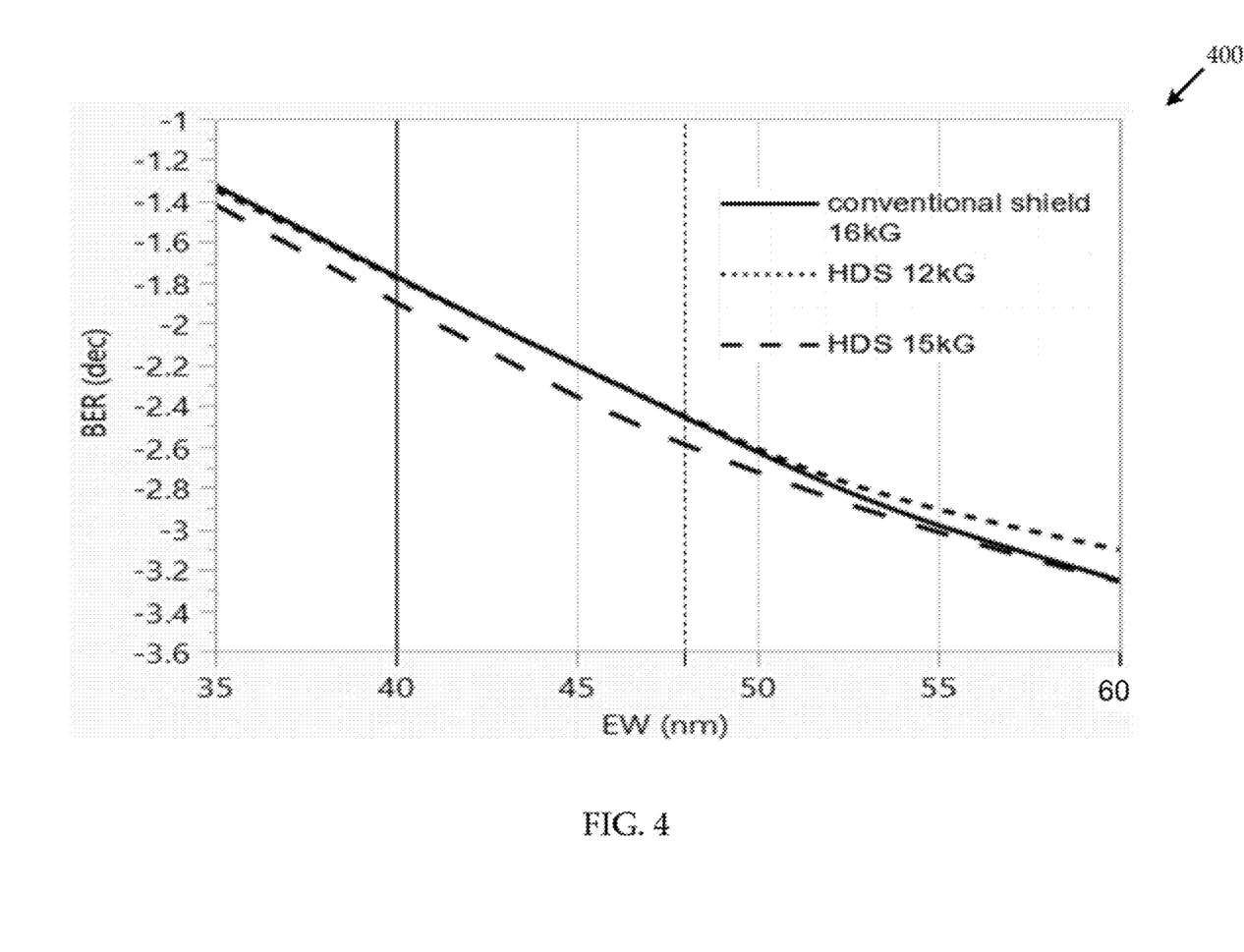
FIG. 4 is a graphical illustration of an example BER and error width (EW) (in nm) according to an embodiment.

A high moment shield can promote more trailing return field, so that high areal density capability (ADC) and lower bit error rate (BER) can be achieved. FIG. 4 is a graphical illustration 400 of an example BER and error width (EW) (in nm). FIG. 4 illustrates that the BER of high moment high damping shield (HMHDS) can be better than a low moment high damping shield (LMHDS) and conventional shield.

The plated HD magnetic material as trailing shield in PMR writer can minimize the WATE. Further, a high moment high damping shield can lower BER and increase ADC as well.

Figure 5:
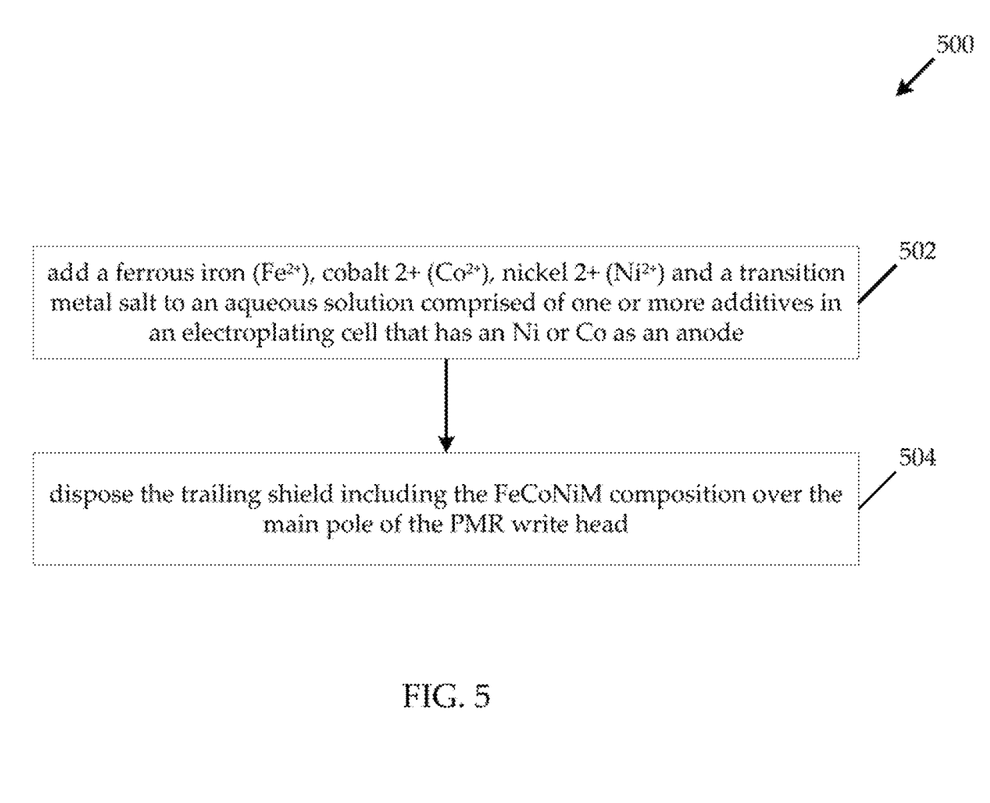
FIG. 5 is an example method for disposing a trailing shield on a main pole of a perpendicular magnetic recording (PMR) write head according to an embodiment.

FIG. 5 is an example method 500 for disposing a trailing shield on a main pole of a perpendicular magnetic recording (PMR) write head. At 502, the method can include adding a ferrous iron ($Fe^{2+}$), cobalt 2+ ($Co^{2+}$), nickel 2+ ($Ni^{2+}$) and a transition metal salt to an aqueous solution comprised of one or more additives in an electroplating cell that has an Ni or Co as an anode. A result of the addition can comprise an iron (Fe)-cobalt (Co)-nickel (Ni)-metal (M) composition.

At 504, the method can also include disposing the trailing shield including the FeCoNiM composition over the main pole of the PMR write head.

In some instances, the plating bath is an aqueous solution comprised of the chemicals and concentrations shown in Table 1. However other suitable chemical constituents can be used in the plating bath as understood by those of ordinary skill in the art and guided by the teaching of the present disclosure, and the embodiments described herein and the scope of the claims are not limited to the example plating bath constituents shown in Table 1.

In some instances, a temperature of the plating bath aqueous solution is between 10-30 degrees Celsius, and a pH level is between 2-4. In some instances, the plating current condition includes a forward plating peak current density ($I_{fp}$) from 10 to 50 mA/cm², a forward plating peak time between 3 to 100 ms, a reverse plating peak current density ($I_{rp}$) from 0 to 15 mA/cm², and/or a reverse plating peak time between 0 to 100 ms.

In an example embodiment, a perpendicular magnetic recording (PMR) write head is provided. The PMR write head can include a main pole, a side shield disposed around the main pole, and a leading shield disposed at a tip portion of the main pole. The PMR write head can also include a trailing shield disposed adjacent to the main pole. The trailing shield can comprise an iron (Fe)-cobalt (Co)-nickel (Ni)-metal (M) composition.

In some instances, the trailing shield is comprised of a composition having the following formula:

wherein: Fe is iron, Co is cobalt, Ni is nickel and M is metal;

w, x, y and z are the concentrations of Fe, Co, Ni and M, respectively, in atomic percent (%);

M is comprised of a 3d, 4d, and 5d transition metal;

w can be between 15 to 70, x can be between 0 to 10, y can be between 20 to 70 and z can be between 2 to 10, and w+x+y+z=100.

In some instances, the trailing shield is disposed on the main pole via electroplating the trailing shield using a mask. In some instances, electroplating the trailing shield using the mask includes adding a ferrous iron ($Fe^{2+}$), cobalt 2+ ($Co^{2+}$), nickel 2+ ($Ni^{2+}$) and a transition metal salt to an aqueous solution comprised of one or more additives in an electroplating cell that has an Ni or Co as an anode.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method comprising:
   disposing a side shield around a main pole for a write head; and
   forming a trailing shield that comprises an iron (Fe)-cobalt (Co)-nickel (Ni)-metal (M) (FeCoNiM) composition that is adjacent to the main pole by:
     adding $Fe^{2+}$, $Co^{2+}$, $Ni^{2+}$ and a transition metal salt to an aqueous solution; and
     applying a pulse to the aqueous solution according to a pulse waveform.

2. The method of claim 1, wherein the pulse waveform comprises a forward plating peak current density ($I_{fp}$) from 10 to 50 mA/cm$^2$, a forward plating peak time between 3 to 100 ms, a reverse plating peak current density ($I_{rp}$) from 0 to 15 mA/cm$^2$, and/or a reverse plating peak time between 0 to 100 ms to form the FeCoNiM composition.

3. The method of claim 1, wherein the trailing shield composition is comprised of the following formula:

$$Fe_wCo_xNi_yM_z,$$

wherein: Fe is iron, Co is cobalt, Ni is nickel and M is metal;
w, x, y and z are the concentrations of Fe, Co, Ni and M, respectively, in atomic percent (%);
M is comprised of a 3d, 4d, and 5d transition metal;
w is between 15 to 70, x is equal to or less than 10, y is between 20 to 70 and z is between 2 to 10, and w+x+y+z=100.

4. The method of claim 1, wherein the trailing shield is disposed on the main pole via electroplating the trailing shield using a mask.

5. The method of claim 4, wherein electroplating the trailing shield using the mask includes adding a ferrous iron ($Fe^{2+}$), cobalt 2+ ($Co^{2+}$), nickel 2+ ($Ni^{2+}$) and the transition metal salt to the aqueous solution comprised of one or more additives in an electroplating cell that has an Ni or Co as an anode.

6. A method for disposing a trailing shield on a main pole of a write head, the method comprising:

adding a ferrous iron ($Fe^{2+}$), cobalt 2+ ($Co^{2+}$), nickel 2+ ($Ni^{2+}$) and a transition metal salt (M) to an aqueous solution to form an FeCoNiM composition; and
disposing the trailing shield including the FeCoNiM composition over the main pole of the PMR write head by applying a pulse to the aqueous solution according to a pulse waveform.

7. The method of claim 6, wherein the aqueous solution is comprised of one or more additives in an electroplating cell that has an Ni or Co as an anode, and plating to form an iron (Fe) cobalt (Ce) nickel (Ni) metal (M) the FeCoNiM composition.

8. The method of claim 6, wherein the pulse waveform comprises a forward plating peak current density ($I_{fp}$) from 10 to 50 mA/cm$^2$, a forward plating peak time between 3 to 100 ms, a reverse plating peak current density ($I_{rp}$) from 0 to 15 mA/cm$^2$, and/or a reverse plating peak time between 0 to 100 ms to form the FeCoNiM composition.

9. The method of claim 6, wherein the aqueous solution comprises chemical constituents comprising any of: $FeSO_4 \cdot 7H_2O$ with a concentration of between 5-30 grams/liter, $NiSO_4 \cdot 6H_2O$ with a concentration of between 10-50 grams/liter, $NiCl_2 \cdot 6H_2O$ with a concentration of between 10-50 grams/liter, $CoSO_4 \cdot 7H_2O$ with a concentration of equal to or less than 20 grams/liter, $H_3BO_3$ with a concentration of between 20-30 grams/liter, Saccharin Na with a concentration of equal to or less than 2 grams/liter, Sodium lauryl sulfate with a concentration of between 0.01-0.2 grams/liter, and Ammonium Perrhenate with a concentration of between 0.04-1.5 grams/liter.

10. The method of claim 6, wherein the trailing shield composition is comprised of the following formula:

$$Fe_wCo_xNi_yM_z,$$

wherein:
w, x, y and z are the concentrations of Fe, Co, Ni and M, respectively, in atomic percent (%);
M is comprised of a 3d, 4d, and 5d transition metal;
w is between 15 to 70, x equal to or less than 10, y is between 20 to 70 and z is between 2 to 10, and w+x+y+z=100.

11. The method of claim 6, wherein a temperature of the aqueous solution is between 10-30 degrees Celsius, and a pH level is between 2-4.

12. A method of forming a trailing shield used in a write head, the method comprising:
adding $Fe^{2+}$, $Co^{2+}$, $Ni^{2+}$ and a transition metal salt to an aqueous solution; and
applying a pulse to the aqueous solution according to a pulse waveform to form the trailing shield, wherein a composition of the trailing shield comprises $Fe_wCo_xNi_yM_z$,
wherein: Fe is iron, Co is cobalt, Ni is nickel and M is metal;
w, x, y and z are the concentrations of Fe, Co, Ni and M, respectively, in the composition and are in atomic percent (%);
M is comprised of a 3d, 4d, and 5d transition metal;
w is between 15 to 70, x is equal to or less than 10, y is between 20 to 70 and z is between 2 to 10, and w+x+y+z=100.

13. The method of claim 12, wherein the pulse waveform comprises a forward plating peak current density ($I_{fp}$) from 10 to 50 mA/cm$^2$, a forward plating peak time between 3 to 100 ms, a reverse plating peak current density ($I_{rp}$) from 0 to 15 mA/cm$^2$, and/or a reverse plating peak time between 0 to 100 ms to form the FeCoNiM composition.

14. The method of claim 12, wherein the trailing shield is disposed on a main pole via electroplating the trailing shield using a mask.

15. The method of claim 14, wherein electroplating the trailing shield using the mask includes adding a ferrous iron ($Fe^{2+}$), cobalt 2+ ($Co^{2+}$), nickel 2+ ($Ni^{2+}$) and the transition metal salt to the aqueous solution comprised of one or more additives in an electroplating cell that has an Ni or Co as an anode.

16. The method of claim 12, wherein the aqueous solution is comprised of one or more additives in an electroplating cell that has an Ni or Co as an anode, and plating to form the FeCoNiM composition.

17. The method of claim 12, wherein the aqueous solution comprises chemical constituents comprising any of: $FeSO_4 \cdot 7H_2O$ with a concentration of between 5-30 grams/liter, $NiSO_4 \cdot 6H_2O$ with a concentration of between 10-50 grams/liter, $NiCl_2 \cdot 6H_2O$ with a concentration of between 10-50 grams/liter, $CoSO_4 \cdot 7H_2O$ with a concentration of equal to or less than 20 grams/liter, $H_3BO_3$ with a concentration of between 20-30 grams/liter, Saccharin Na with a concentration of equal to or less than 2 grams/liter, Sodium lauryl sulfate with a concentration of between 0.01-0.2 grams/liter, and Ammonium Perrhenate with a concentration of between 0.04-1.5 grams/liter.

18. The method of claim 12, wherein a temperature of the aqueous solution is between 10-30 degrees Celsius, and a pH level is between 2-4.

* * * * *